June 23, 1959

O. H. TRAGGE 2,891,429

BEARING POCKET BORING TOOL

Filed June 18, 1957

INVENTOR.
OLIVER H. TRAGGE
BY
ATTORNEY

United States Patent Office 2,891,429
Patented June 23, 1959

2,891,429
BEARING POCKET BORING TOOL

Oliver H. Tragge, Detroit, Mich., assignor of one-third to Aaron Weiswasser, Huntington Woods, and one-third to Isadore Silverman, Detroit, Mich.

Application June 18, 1957, Serial No. 666,299

5 Claims. (Cl. 77—65)

This invention relates to a bearing pocket boring tool and more particularly to such a boring tool having a drill point to provide accuracy and precision in metal bearing pocket or blind hole boring operations.

A preferred embodiment of the invention provides a tool having an adjustable centrally positioned drill point, a pair of opposedly positioned flat recessing cutting bits or blades, a second pair of opposedly positioned cutting bits arranged at a different, but larger, cutting diameter than that of the first pair, and a hole chamfering bit, all fixedly mounted on a single tool shank.

One of the principal problems in machining parts for automation equipment is the precise and accurate boring of bearing pockets or blind holes in the various parts. The limits specified for spacing holes from each other, as well as for hole diameters and out-of-roundness, is often within one-one thousandth of an inch or less. Such tolerances require extremely accurate tooling and machining, and for skill on the part of the machine operator. Prior to the development of the instant invention, holes were bored by first drilling a lead or pilot hole with a drill point, then boring the bearing relief diameter for grease, then cutting the rough bearing bore, chamfering the edge of the bearing pocket, and completing the cycle with a finish bearing boring operation. In all there were five distinct and separate tooling and machining operations. Each time a tool was changed the new tool had to be reset in order to control the depth of the machining step.

This practice has been extremely costly in time consumed and in the amount of tooling required. Machinists and tool makers are among the highest paid in the trade, and the tooling is made of the finest and most expensive of steels and cutting metals. In addition to these initial and basic costs, due to the number of operations involved and the normal and usual variability in tooling and human error, considerable scrap in the fabrication of automation equipment parts was occasioned.

The invention here disclosed provides a single tool functioning in a single operation, after a single setting of the tool in a suitable machine, to perform a complete bearing pocket boring operation. The drill point in the tool provides a guide and center for the flat recessing cutting blades or bits which are applied to the work under tremendous pressure. Without the drill point, the tool would chatter, wobble, and try to drift away from the hole location. By combining a drill point adjustable as to depth of cut and with respect to the boring bits, with diameter and hole face boring bits and a hole edge chamfering tool, the time required for precisely and exactly boring a hole has been reduced from 30 minutes under the old practice to less than one minute with this improved boring tool. It will readily be recognized that such savings will markedly reduce the cost of these precision machined parts while providing a high run of accurately bored pieces.

It is therefore an object of the invention to provide a bearing pocket or blind hole boring tool having a drill point adjustably positionable in the tool shank. Another object is to provide one or more hole face boring bits fixedly mounted on the tool shank to cut a single hole diameter, and one or more boring bits also fixedly mounted on the same tool shank to cut a second hole diameter. A further object is to provide a hole edge chamfering tool bit fixedly mounted on the tool shank to finish the edge of the hole. Still another object is to combine these metal cutting tool bits on a single tool shank so that only a single metal cutting tool and only one metal cutting operation is required to precisely machine and finish a hole in a part. A still further object is to achieve precision boring operations by a reduction in the number of tools required to a single one, and thus to reduce the cost of precision boring operations. Yet another object is to provide such a boring tool which is relatively inexpensive, precise and accurate in its functioning, and easy to use by those skilled in the art to which the invention pertains.

These and additional objects of the invention and features of construction will become more apparent from the description given below, in which the terms are used for purposes of description and not of limitation.

Referring now to the drawing annexed hereto and forming an integral part of this specification, Fig. 1 is a side elevational view of a preferred embodiment of this invention.

Figure 1:
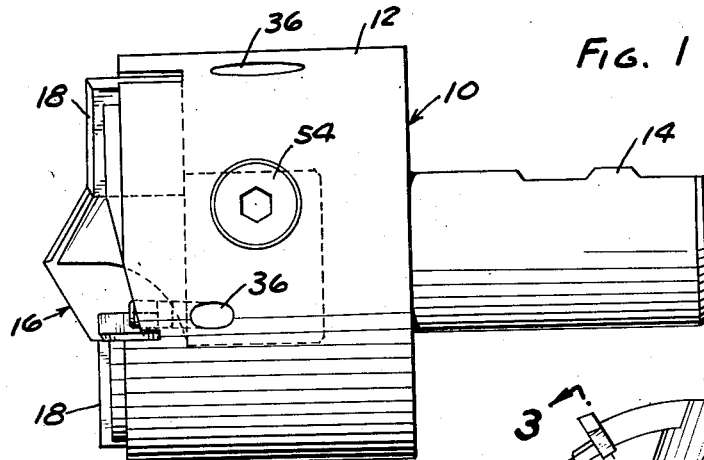
Figure 2:
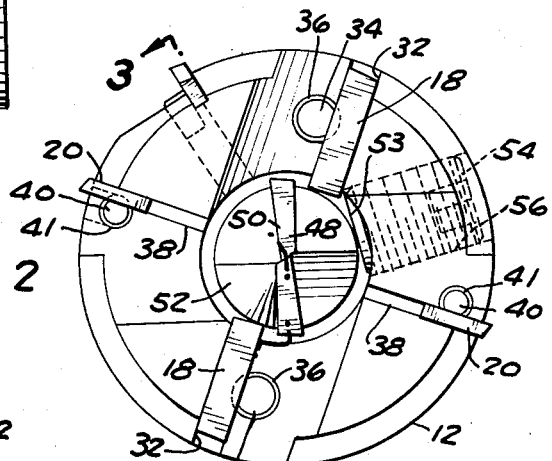
Fig. 2 is a front elevational view of the boring tool of Fig. 1.
Figure 3:
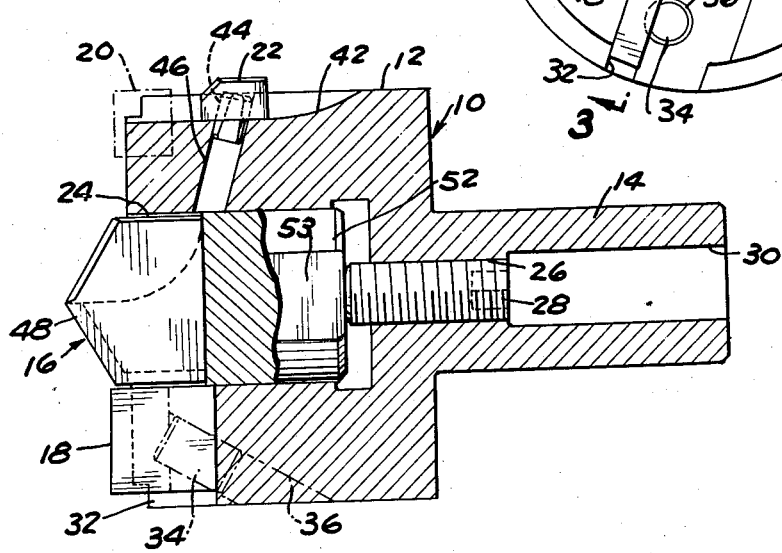
Fig. 3 is a sectional view substantially on the line 3—3 of Fig. 2.

As shown in the several views of the drawing, the boring tool 10, a preferred embodiment of the invention, comprises a tool shank 12, an integrally formed arbor 14, a drill point center 16, a first pair of opposed hole face and diameter cutting bits 18, a second pair of opposed hole diameter cutting bits 20, and a hole chamfering bit 22.

The tool shank or barrel portion 12 is preferably cylindrical in shape, having a counterbore 24 therein at one end to receive the drill point center 16. A threaded bore 26 to threadedly engage the headless adjusting screw 28 is disposed axially of the shank 12, bore 30 in arbor 14 being slightly enlarged to pass the screw directly to the threaded bore 26. Shank 12 is further provided with tool bit slots 32 to receive the tool bits 18. These slots are cut in planes parallel to each other, though slightly offset from center, from the counterbore 24 to the outer periphery of the shank. Wedge locking pins 34 in angled holes 36 bear against the tool bits 18 to hold them firmly in the slots 32.

The second set of tool bits 20 are similarly located in shank slots 38, cut from the counterbore 24 to the outer periphery of the shank in planes parallel to each other and slightly offset from center. Wedge locking pins 40 in angled holes 41 hold the bits 20 fixedly in their slots. As shown, the tool bits 20 are arranged to cut a hole of larger diameter than tool bits 18, being spaced outwardly of the shank periphery. Also, the tool bits 20 are disposed in the slots below the cutting plane of the bits 18, which perform the first hole face and diameter cutting operation.

The practice of wedge locking tool bits of the type here shown and described by means of wedge locking pins has been in use for some time by persons skilled in the art to which the invention pertains. Further, the use of indexable tungsten carbide tool bits, ceramic bits, or metal cutting steel bits in boring tools is and has been common practice for some time.

Shank 12 is also provided with a slot 42 longitudinally of the shank to receive the hole chamfering tool bit 22, which is held in place by the wedge locking pin 44 in its angled bore 46, running substantially transversely of the shank from the outer periphery to the counterbore 24. Chamfering bit 22 may be adjustably positioned along its slot 42.

Drill point center 16 comprises a drill bit 48 disposed in a slot 50 at the front end of the cylindrical center shank 52. The shank has a flat 53 longitudinally arranged at one side for locking engagement with a set screw 54 which threads its way to the center shank in the transverse hole 56. Drill bit 48 may be made in a single blank form or in a two-piece arrangement. The shank 52 has a diameter substantially that of counterbore 24 so that there is no sloppy fit or chattering during operation of the tool 10. The screw 54 merely keeps the shank 52 from rotating in the counterbore 24.

The tool 10 is assembled for use by placing drill point center 16 in the counterbore 24. Adjusting screw 28 is advanced or retracted against the bottom of the center 16 to position the drill point bit 48 at the desired or required distance forward of the cutting bits 18. Set screw 54 is then advanced against the shank flat 53 locking the drill point center 16 in the counter-bore 24.

Tool bits 18 and 20 are then placed in their respective slots 32 and 38, and locked in position by the wedge pins 34 and 40, respectively. The tool bits may be adjusted radially of the center to change the hole cutting diameter, within limits defined in one respect by the diameter of the tool shank 12. Hole chamfering tool bit 22 is placed in its slot 42 and wedge locked in place by the pin 44. The boring tool 10 is then ready for insertion in the collet of a machine tool for rotational driving.

It will be readily understood from the foregoing description that the combination of a drill point center with hole cutting tool bits accomplishes the objects of the invention as set forth above, and further prvides a compact tool of great utility, saving considerable time in the accomplishment of its purpose, to drill precise and accurate holes. The tool 10 is flexible in its structural arrangement, permitting adjustments for hold diameter cutting, hole chamfering, and hole facing, all in the one tool. By the inventive combination here disclosed the cost of tooling, as well as the cost of operation, is materially and substantially reduced.

The tool bits 18 and 20 and the drill bit 48 are preferably made of tungsten carbide. However, other metal cutting materials may be used, such as high speed steel, ceramic material, etc. The tool shank 12 and drill point shank 52 are preferably made of a high grade of tool steel.

Having described the invention in its simplest terms, it is to be understood that the features of construction may be changed and varied in greater or lesser degree without departing from the essence of the invention.

I claim:

1. In a metal boring tool, a cylindrical solid unitary tool shank having a driving arbor at the rearward end thereof, said shank being provided with an axial counterbore at the forward end thereof, a removable drill point center axially secured in said counterbore and having its drill point forward of the forward end of said shank, the face of said shank forward end being substantially radially slotted at spaced intervals for a depth less than the length of said shank, a first set of hole facing and diameter cuting tool bits removably secured in the slots in said shank face, and a second set of diameter cutting tool bits removably secured in said slots in said shank face positioned alternately with respect to said first set of tool bits, said first set of tool bits being arranged for cutting a diameter ranging from the diameter of said tool shank to a diameter less than that of said tool shank, said second set of tool bits being arranged for cutting a diameter greater than the diameter of said tool shank and having their cutting edges positioned rearwardly of the cutting edges of said first set of tool bits, said first set of tool bits having their cutting edges positioned rearwardly of and adjacent the tip of said drill point center, each of said tool bits slots being of a depth in said shank to bottom seat said first set of tool bits in hole facing and diameter cutting position and to bottom seat said second set of tool bits in diameter cutting position, said slots having spaced parallel radial side walls and bottom seats in planes normal to said side walls, each of said tool bits being radially adjustable in said slots.

2. The structure defined in claim 1, and in which a hole chamfering tool bit is removably secured at the periphery of said shank rearwardly of the cutting edges of said second set of tool bits.

3. The structure defined in claim 2, and in which said hole chamfering tool bit is longitudinally adjustable in said slot at said periphery.

4. The structure defined in claim 1, and in which said drill point center comprises a cutting tool bit mounted in the forward end of a smooth cylindrical body removably and adjustably positioned in said counterbore, a bore communicating with said counterbore through said tool shank and arbor, and means in said bore in contiguous bearing contact against the rearward end of said cylindrical body for holding said drill point tool bit in adjusted position with respect to the cutting edges of said first set of tool bits adjacent thereto.

5. The construction defined in claim 1, and in which said first set of tool bits is positioned radially in adjacent overlapping relationship to said drill point center.

References Cited in the file of this patent

UNITED STATES PATENTS

| | | |
|---|---|---|
| Re. 16,817 | Smith | Dec. 13, 1927 |
| 645,760 | Spencer | Mar. 20, 1900 |
| 936,955 | Steinbrunn | Oct. 12, 1909 |
| 1,648,802 | Gairing | Nov. 8, 1927 |
| 1,887,374 | Emmons | Nov. 8, 1932 |
| 2,643,692 | O'Brien | June 30, 1953 |
| 2,649,001 | Fennell | Aug. 18, 1953 |

OTHER REFERENCES

"A Combined Drill and Counterbore," "American Machinist" magazine. Page 69 Jan. 11, 1912.